Sept. 11, 1962    J. E. MARTIN    3,053,157
VIBRATORY COMPACTING DEVICE
Filed May 1, 1959
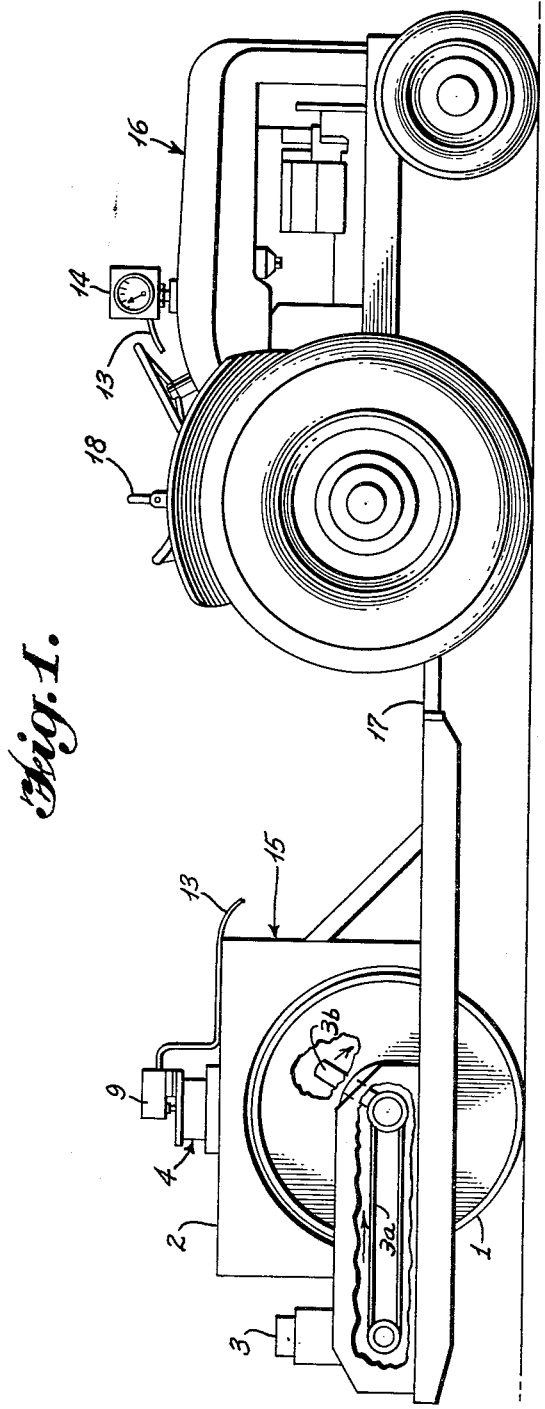
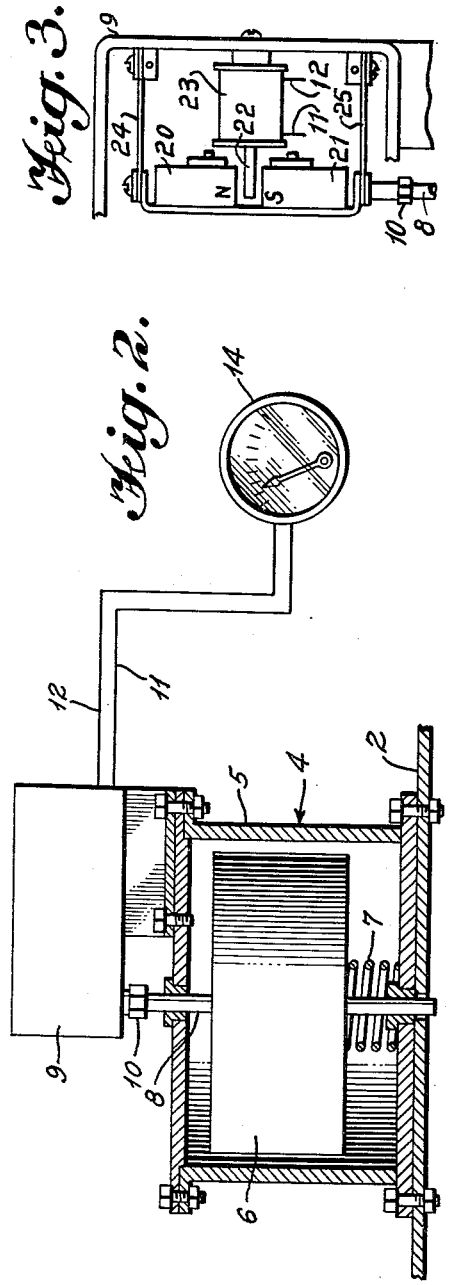
INVENTOR
John E. Martin
BY
Burns, Doane, Benedict & Irons
ATTORNEYS

United States Patent Office 3,053,157
Patented Sept. 11, 1962

3,053,157
VIBRATORY COMPACTING DEVICE
John E. Martin, San Antonio, Tex., assignor to Tampo Manufacturing Co., Inc., San Antonio, Tex., a corporation of Texas
Filed May 1, 1959, Ser. No. 810,363
2 Claims. (Cl. 94—50)

This invention relates to a vibratory compactor, and, more particularly, to a vibratory road compactor including a device for indicating the amplitude of vibratory motion and means for adjusting the speed of vibration of the compactor for maximum amplitude of such motion.

A commonly used vibratory road compactor is the towed trailer type with a rotating roll which is forced to vibrate. The amplitude of such vibration is dependent upon many factors such as the weight of the compactor, the amount and frequency of the vibrating force, and the material being compacted. However, when the speed of vibratory motion reaches the resonant frequency of the material beneath the compacting roller, the amplitude of vibration, and therefore the efficiency of the compactor, becomes maximum. It is therefore desirable to adjust the speed of vibratory motion to the resonant frequency of the material being compacted. However, this resonant frequency varies with the material beneath the compacting roller, being related to the kind of material, the moisture content thereof, etc. It is therefore not possible to adjust the speed or frequency of vibration to one setting and to obtain with that speed maximum efficiency for the various different materials traversed by the compactor.

This invention has for one of its objects the furnishing of an indication to the operator of the apparatus, which indication is directly related to the amplitude of vibratory movement of the compactor. The apparatus further includes a speed control for the motor or engine-driven vibrating means which imparts the vibratory motion to the compactor, so that the speed can be adjusted to that for which maximum amplitude of vibration of the compactor is obtained. With this improved apparatus it is possible for an operator to adjust the frequency of the compactor so that it is substantially continuously adjacent the resonant frequency of the material being compacted, despite changes in the characteristics of such materials.

The invention will now be more particularly described in conjunction with a drawing showing a preferred embodiment thereof.

In the drawing,

FIG. 1 is a vertical elevational view showing the compacting device and towing tractor, with the improvements of the invention mounted thereon, FIG. 2 is an elevational view, partly in section, showing the indicating means and vibratory amplitude transducing device of the invention, to a larger scale than shown in FIG. 1; and, FIGURE 3 shows diagrammatically a representative transducer arrangement for use in the invention.

Referring first to FIG. 1, the compacting roller 1 is carried by a frame 2 which mounts the roller for vibratory motion. Such motion is furnished to the roller from an engine diagrammatically shown at 3, through a belt 3a to vibrating means 3b of a type well known to the art. The frame 2, being appropriately supported on the roller 1, moves in a vibratory fashion similarly to the roller.

The frame 2 also carries the transducing apparatus for furnishing an indication of the amplitude of vibratory motion to the roller 1. This transducing apparatus is generally indicated by the numeral 4 in FIG. 1 and is shown in greater detail in FIG. 2. As shown in that figure, the apparatus includes a housing 5 which is bolted to the frame 2. Within the housing is mounted a massive element or mass member 6 which is supported above the bottom wall of the housing by spring 7. The mass member 6 carries a vertically-extending shaft 8 which extends through the upper wall of housing 5 and into the transducing element 9. The transducing element 9 includes a housing which is bolted to the mass housing 5, so that both housings are fixed with respect to the frame 2 and move therewith.

The shaft 8 is attached to the moving part of the transducer element by means of the clamping nut 10, and the transducer element includes an appropriate device for developing an electrical voltage of magnitude determined by the amplitude of relative motion between the housing of transducer 9 (and therefore frame 2) and the mass member 6. The transducer element may be of a conventional type such as shown in United States Patent 2,383,405, issued August 21, 1945, to Merrill et al., shown diagrammatically in FIGURE 3 comprising a pair of movably mounted magnets 20 and 21, poled as shown to cooperate with an armature 22 carrying windings 23 feeding conductors 11 and 12 of cable 13. Magnets 20 and 21 are supported inside enclosure 9 by resilient members 24 and 25. As clamping nut 10 is vibrated by shaft 8 on which the massive element 6 of FIGURE 2 is mounted, the proximity of the pole faces of magnets 20 and 21 is varied with respect to armature 22 so as to induce an alternating flux therein, which in turn generates an electromotive force in windings 23. The magnitude of this voltage is indicated by the meter 14. As referred to above, the reading of meter 14 is proportional to the amplitude of relative vibration of massive element 6 with respect to the housing 9 and the frame 2 of the roller.

The transducer element 9 is connected by appropriate conductors 11 and 12 in a cable 13 to a meter indicator 14. The meter 14 provides a reading of amplitude related to the amplitude of the voltage developed by transducer element 9, and may be calibrated directly in appropriate linear measure.

It will be evident that the mass member or massive element 6, being spring-supported with respect to the frame 2, will remain relatively stationary. The frame, as indicated above, vibrates with the compacting roller 1, so that there is relative motion between the housing of transducer element 9 and the shaft 8 attached to massive element 6. A meter 14 will indicate the amplitude of this motion, and therefore the amplitude of vibratory motion of roller 1.

The roller 1 and frame 2 comprise a trailer 15 which is connected to an appropriate motor vehicle, such as tractor 16, by a tow bar 17 or other similar device. The meter 14 is positioned on the tractor for ready observation by the operator thereof, and adjacent the operator's seat there is mounted a throttle 18 which is connected through appropriate linkage (not shown) to the engine 3. By adjustment of throttle 18 the operator can adjust the speed of the engine and therefore the frequency of vibratory motion of compacting roller 1.

In operation of the apparatus, the meter 14 continuously exhibits a reading which is determined by the amplitude of vibratory movement of roller 1. In order to obtain maximum amplitude of such movement, the operator adjusts the position of throttle 18 to thereby change the speed of engine 3 until it approaches or coincides with the resonant frequency of the material beneath the roller. At that time the amplitude of vibratory movement, as shown by meter 14, will be maximum. Therefore, the operator can maintain the frequency of such motion at or near the resonant frequency of the material being compacted by adjustment of throttle 18 for maximum reading on meter 14.

It will be evident that many minor changes could be made in the apparatus described as a preferred embodiment of this invention without departure from the scope

I claim:

1. A vibratory road compactor comprising a motor vehicle, a trailer attached to said vehicle for movement therewith, said trailer including a frame, a compacting roller supported from said frame for vibratory motion, means including an engine independent of said motor vehicle and mounted on said frame and operable to impart vibratory motion to said compacting roller at a frequency determined by the speed of said engine, a massive element spring-supported from said frame, means carried by the frame for developing an electrical output determined by the amplitude of relative movement between said frame and said massive element comprising a movable member connected to the massive element, a meter positioned on the motor vehicle for observation by the operator, means connecting said electrical output developing means to said meter to develop a reading thereon related to the magnitude of such relative motion, and a throttle positioned on the motor vehicle near said meter for ready access by an operator observing the meter and operable to adjust the speed of said engine, whereby the operator may readily adjust the speed of the engine in accordance with the meter reading to obtain the maximum amplitude of vibratory motion of the compacting roller.

2. A vibratory compactor including a compacting member mounted for vibratory motion, means including motor means coupled to impart only vibratory motion to said compacting member, means for adjusting the speed of said motor means to adjust the frequency of vibration of said compacting member, the amplitude of vibratory motion of said compacting member being related to the characteristics of the material being compacted and to the frequency of its vibratory motion, a frame supported on the compacting member, a massive element spring-supported on said frame, whereby the frame vibrates with the compacting member relative to said massive element, means carried by the frame for supplying an electrical output determined by the amplitude of relative movement between the frame and the massive element comprising a movable member connected to the massive element, and a meter connected to the last named means operable to indicate a reading related to the amplitude of such relative motion, whereby the speed-adjusting means may be adjusted in accordance with the amplitude indication to vibrate the compacting member at the proper frequency for highest amplitude of motion and therefore highest efficiency, said frame comprising means for attaching to said compactor power means independent of said motor means for moving said compactor over the surface of the material being compacted.

References Cited in the file of this patent

UNITED STATES PATENTS

| | | |
|---|---|---|
| 1,955,101 | Sloan | Apr. 17, 1934 |
| 2,677,995 | Wood | May 11, 1954 |
| 2,897,734 | Bodine | Aug. 4, 1959 |

FOREIGN PATENTS

| | | |
|---|---|---|
| 737,432 | Great Britain | Sept. 28, 1955 |